United States Patent
Rubinstein et al.

(10) Patent No.: US 9,537,814 B2
(45) Date of Patent: Jan. 3, 2017

(54) SPAM DETECTION AND PREVENTION IN A SOCIAL NETWORKING SYSTEM

(71) Applicant: Facebook, Inc., Menlo Park, CA (US)

(72) Inventors: Yigal Dan Rubinstein, Los Altos, CA (US); Josh Wiseman, San Francisco, CA (US); Matthew Kai-Shing Choi, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 719 days.

(21) Appl. No.: 13/714,776

(22) Filed: Dec. 14, 2012

(65) Prior Publication Data

US 2014/0172989 A1   Jun. 19, 2014

(51) Int. Cl.
*G06F 15/16* (2006.01)
*H04L 12/58* (2006.01)

(52) U.S. Cl.
CPC .............. *H04L 51/32* (2013.01); *H04L 51/12* (2013.01)

(58) Field of Classification Search
USPC .................................. 709/206, 220; 726/11
See application file for complete search history.

(56) References Cited

U.S. PATENT DOCUMENTS

| | | | |
|---|---|---|---|
| 6,965,930 B1 * | 11/2005 | Arrowood et al. ........... | 709/223 |
| 7,062,556 B1 * | 6/2006 | Chen et al. ................... | 709/226 |
| 7,512,702 B1 * | 3/2009 | Srivastava et al. ........... | 709/238 |
| 7,693,945 B1 * | 4/2010 | Dulitz et al. ................... | 709/206 |
| 7,921,159 B1 * | 4/2011 | Cooley .......................... | 709/206 |
| 8,205,264 B1 * | 6/2012 | Kailash et al. ................. | 726/25 |
| 9,043,417 B1 * | 5/2015 | Jones .................. | H04L 63/1416 709/206 |
| 2002/0116583 A1 * | 8/2002 | Copeland et al. ............. | 711/133 |
| 2003/0200283 A1 * | 10/2003 | Suryanarayana et al. .... | 709/219 |
| 2009/0106368 A1 * | 4/2009 | Padveen et al. ............... | 709/206 |
| 2012/0102130 A1 * | 4/2012 | Guyot et al. .................. | 709/206 |
| 2013/0097253 A1 * | 4/2013 | Mencke ................. | G06Q 50/01 709/206 |
| 2013/0268470 A1 * | 10/2013 | Yablokov et al. ............. | 706/15 |
| 2014/0259157 A1 * | 9/2014 | Toma .................. | H04L 63/1408 726/22 |

* cited by examiner

*Primary Examiner* — Tammy Nguyen
(74) *Attorney, Agent, or Firm* — Fenwick & West LLP

(57) ABSTRACT

A social networking system detects spam in comments posted by users of the social networking system. A spam prevention module of the social networking system retrieves content signals associated with a posted comment and analyzes the content signals to determine whether the posted comment contains spam content. The spam prevention module augments the content signal analysis by analyzing social signals of the posted comment. Based on the content signal analysis and the social signal analysis, the spam prevention module determines whether the posted comment is spam and takes remedial actions on detected spam, including blocking the comment and educating the user who posted the comment.

20 Claims, 5 Drawing Sheets

SPAM DETECTION AND PREVENTION IN A SOCIAL NETWORKING SYSTEM

BACKGROUND

This invention relates to social networking systems and in particular to spam detection and prevention in a social networking system.

Social networking systems have become increasingly popular for users to create connections with friends and interact with each other in social networking sites. Social networking systems store social information provided by users including (but not limited to) hometown, current city, education history, employment history, photos, and events in which the user participated in the user's profile. Users use social networking systems to view other users' profiles, organize events, and invite friends to participate in those events. Social networking sites also commonly include newsfeeds and walls or profile pages on which users can post comments and communicate with other users.

Users within a social networking system are presumably connected based on trust and shared values/interests. However, the benefits of bringing people together by social networking systems are occasionally accompanied by inappropriate or unacceptable conduct by spammers, who post advertisements or random comments on a social networking user's wall associated with his networking site. For example, a spammer might post a hyperlink on a social networking user's wall that points to the spammer's website with the goal of artificially increasing the search engine ranking of that site so that it is listed above other sites in certain searches. In some cases, where a user on a social networking website clicks on the spammer's hyperlink, the spammer actually posts to the walls of that user's friends using the user's account or identity. Those friends see the hyperlink that appears to have come from a user they recognize, so they click on it and thus continue the propagation of the spam.

Another form of inappropriate or unacceptable conduct in a social networking system is when users post a large amount of useless and/or bad comments on a subscribed page. A subscribed page refers to a page of a public person (e.g., Lady Gaga), business, product, or other page to which a social networking user can subscribe or which a social networking user can "like" in order to form a connection with that page in the social networking system. Users who subscribe to a page will then be able to see posts that occur on that page and will be able to comment on those posts. Other users subscribing to the page will also be able see the comments. For example, posts by Lady Gaga on her page will be visible to all users who have subscribed to her page (i.e., the posts may appear in the newsfeed of users who have subscribed to or "liked" her page or the users can review Lady Gaga's posts by going to Lady Gaga's page). These users can also comment on her posts, including offensive and nonsense comments, and the users' comments will also be visible on her page or provided in a newsfeed to other users subscribing to her page.

The amount and types of information that can be shared in these social networking environments is vast, and a given user's network can grow over time as the user connects to more and more other users. Detecting spam in a social networking environment with a large variety of possible and fast changing social activities and behaviors is challenging. Conventional spam detection methods, e.g., spam detection based on voluntary user spam reports, or signature-based anti-spamming supported by extensive offline model building, are not suitable for spam detection in a social networking system. For example, the feature space in the social networking environment is too large to efficiently build effective spam fingerprints, and when a remedial action is taken based on user spam reports, users are already annoyed and harmed. To provide better services in a social networking system, it is helpful to detect and prevent spam in an online social networking environment in a scalable and efficient way.

SUMMARY

A method and a social networking system are provided to detect and prevent spam using content signals and social signals in a social networking system. In one embodiment, the social networking system detects spam in content or other posts or comments by users of the social networking system. A spam prevention module of the social networking system retrieves content signals associated with posted content, such as a comment on a post, and analyzes the content signals to determine whether the content contains spam or other undesirable material. The spam prevention module augments the content signal analysis by analyzing social signals of the posted content. Based on the content signal analysis and the social signal analysis, the spam prevention module determines whether the posted content is spam and takes preemptive or remedial actions regarding the detected spam, including blocking the content or notifying or even providing some level of education to the user who posted the content regarding the issues with posting offensive or spam-like content.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system allows users to communicate and interact with other users of the social networking system. A user that joins the social networking system can add connections to other users. The term "connection" refers to any other user to whom a user has formed a connection, association, or relationship via the social networking system (connections are sometimes referred to herein by using the term "friend"). Connections may be added explicitly by a user, for example, the user selecting a particular other user to connect to, or automatically created by the social networking system based on common characteristics of the users (e.g., users who are alumni of the same educational institution). The friendships among multiple users can be represented by a social networking graph.

Figure 1:
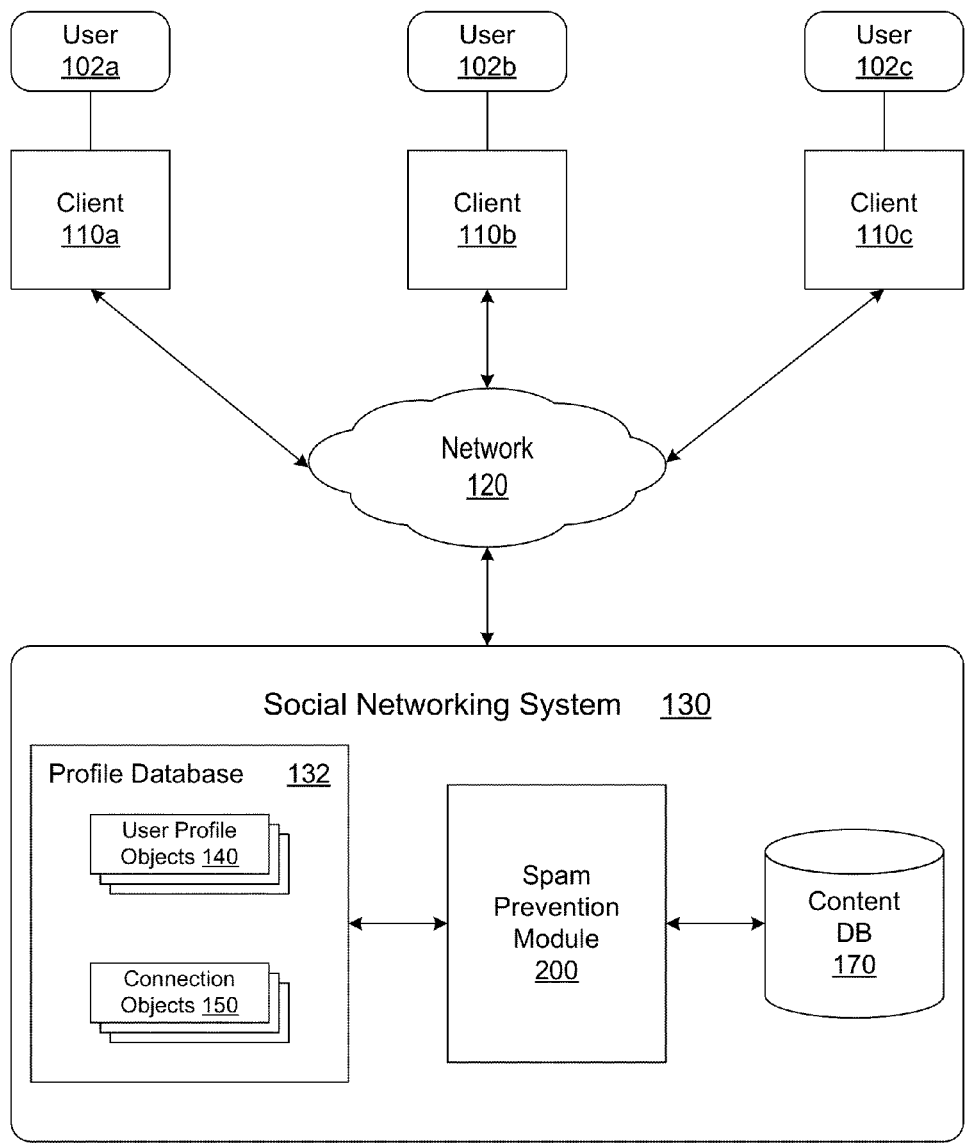
FIG. 1 is a high-level block diagram of a computing environment of spam detection and prevention in a social networking system according to one embodiment.

FIG. 1 is a high-level block diagram of a computing environment 100 of spam detection and prevention in a social networking system 130 according to one embodiment. FIG. 1 illustrates three clients 110 used by users 102 and the social networking system 130 connected by a network 120. The illustrated environment 100 represents a typical computing environment where the social networking system 130 detects spam from the users 102. Only three users 102, three clients 110 and one social networking system 130 are shown in FIG. 1 in order to simplify and clarify the description. Embodiments of the computing environment 100 can have many users 102 and clients 110 connected to the social networking system 130 via the network 120.

A user 102 is an individual that networks together socially with other users 102 in a social networking environment, e.g., a user of social networking services provided by a social networking website. These users 102 can interact on social networking websites, which allow them to post comments on blogs, create online profiles or sites, communicate with others, upload photos, etc. In some embodiments, multiple users 102 of a social networking service are linked together as "friends."

A client 110 is an electronic device used by a user 102 to perform functions such as posting comments on a friend's site for the user 102, browsing websites hosted by web servers on the network 120, and interacting with the social networking system 130, and/or other entities on the network. In one embodiment, the client 110 is a personal computer (PC) executing an operating system (OS), such as a desktop, notebook, or tablet computer. In other embodiments, the client 110 is a mobile telephone, personal digital assistant, television set-top box, or other electronic device.

The network 120 enables communications between the users 102 or clients 110 and the social networking system 130. In one embodiment, the network 120 is the Internet, and uses standardized internetworking communications technologies and protocols, known now or subsequently developed that enable the clients 110 to communicate with the social networking system 130. In another embodiment, the network 120 is a cloud computing network and includes one or more components of a social networking service provided by the social networking system 130.

The social networking system 130 offers its users 102 the ability to communicate and interact with other users 102, e.g., post content on their personal sites or on the sites of other users of the social networking system 130. As used herein, the term "site" refers to a user's personal site or profile, including the locations at which information can be posted on and/or commented on (e.g., the user's walls). As illustrated in FIG. 1, the social networking system 130 includes different types of objects/modules representing entities, for example, a profile database 132, a spam prevention module 200 and a content database 170. Other embodiments of the social networking system 130 may include additional, fewer, or different objects/modules for various applications.

In one embodiment, the profile database 132 includes user profile objects 140 and connection objects 150. A user profile object 140 stores information describing a user of the social networking system 130. The information associated with a user profile object 140 includes biographic, demographic, and other types of descriptive information, such as work experience, educational history, gender, sexual preferences, hobbies or preferences, geographical location, and the like. The user profile object 140 may also store information provided by the users 102, for example, images, videos, comments, and status updates. Images of users may be tagged with the identification information of the appropriate users displayed in an image.

The user profile object 140 may also store information of actions that a particular user takes using the social networking system 130. Such actions may include, for example, posting a comment on a post by another user, sending a message to another user, reading a message from another user, adding a connection to another user, viewing content associated with another user, attending an event posted by another user, among others. In addition, a number of actions described below in connection with other objects are directed at particular users, so these actions are associated with those users as well.

The user profile object 140 may further store information about the user's publishing behavior (e.g., posting comments on other users' walls), including what the user tends to write on other users' walls, how much content he generally writes, the amount of time spent writing, the times of day when the user tends to write, the general topics he tends to write about, his typical writing style, and so forth.

A connection object 150 stores information describing relations between two users 102 of the social networking system 130 or in general any two entities represented in the social networking system 130. In one embodiment, the connection object 150 stores data describing the connections between different users 102 of the social networking system 13. The record of users and their connections in the social networking system 130 may be called a "social graph."

Connections may be added explicitly by a user 102, .e.g., the user 102 selecting a particular other user to be a friend, or automatically created by the social networking site based on common characteristics of the users (e.g., users who are alumni of the same educational institution). In one embodiment, the connections are defined by users, allowing users to specify their relationships with other users. A connection may specify a connection type based on the type of relationship, for example, family, or friend, or colleague. Users 102 may select from predefined types of connections, or define their own connection types as needed.

Connections in a social networking system can be directional, e.g., one or two-way connections. For example, if Bob and Joe are both users and connected to each other in the social networking system, Bob and Joe have a two-way connection. If Bob is interested in learning more information about Joe, but there is not a reciprocal connection, a one-way connection may be formed with Bob being connected to Joe, but Joe not being connected to Bob. The connection between users 102 of the social networking system 130 may be a direct connection (also also called "first-degree connection"); other embodiments of a social networking system 130 allow the connection to be indirect via two or more levels of connections between a pair of users.

The social networking system 130 also includes a content database 170 and a spam prevention module 200. The content database 170 stores content of postings posted by users and comments on the posts by users in a social networking environment. For example, for each posted comment, the content database 170 may store timing information regarding the posting, geographical information (e.g., the source (country/state/city) of the posting and the destination of the posting), frequency information (e.g., how often the user posts comments on others' blogs or walls), acceptance rate of the posting over a specified period of time, and other relevant information associated with the posting. The content database 170 may store content that has been flagged as inappropriate or spam in a separate part of the content database 170. The content database 170 may store additional information, such as a black list of user accounts that have been detected as fake or compromised.

The spam prevention module 200 is for detecting spam within the social networking system 130 based on multiple signals associated with content posted by users (e.g., of comments) and their associated commenting users and viewers. The spam prevention module 200 retrieves data stored in the content database 170, user profile objects 140 and connection objects 150 for spam detection. Based content signals and social signals of the content, the spam prevention module 200 determines whether the user posting the content is a spammer or a particular comment or other content posted is spam in terms of being offensive or inappropriate and takes remedial actions on the detected spam.

Figure 2:
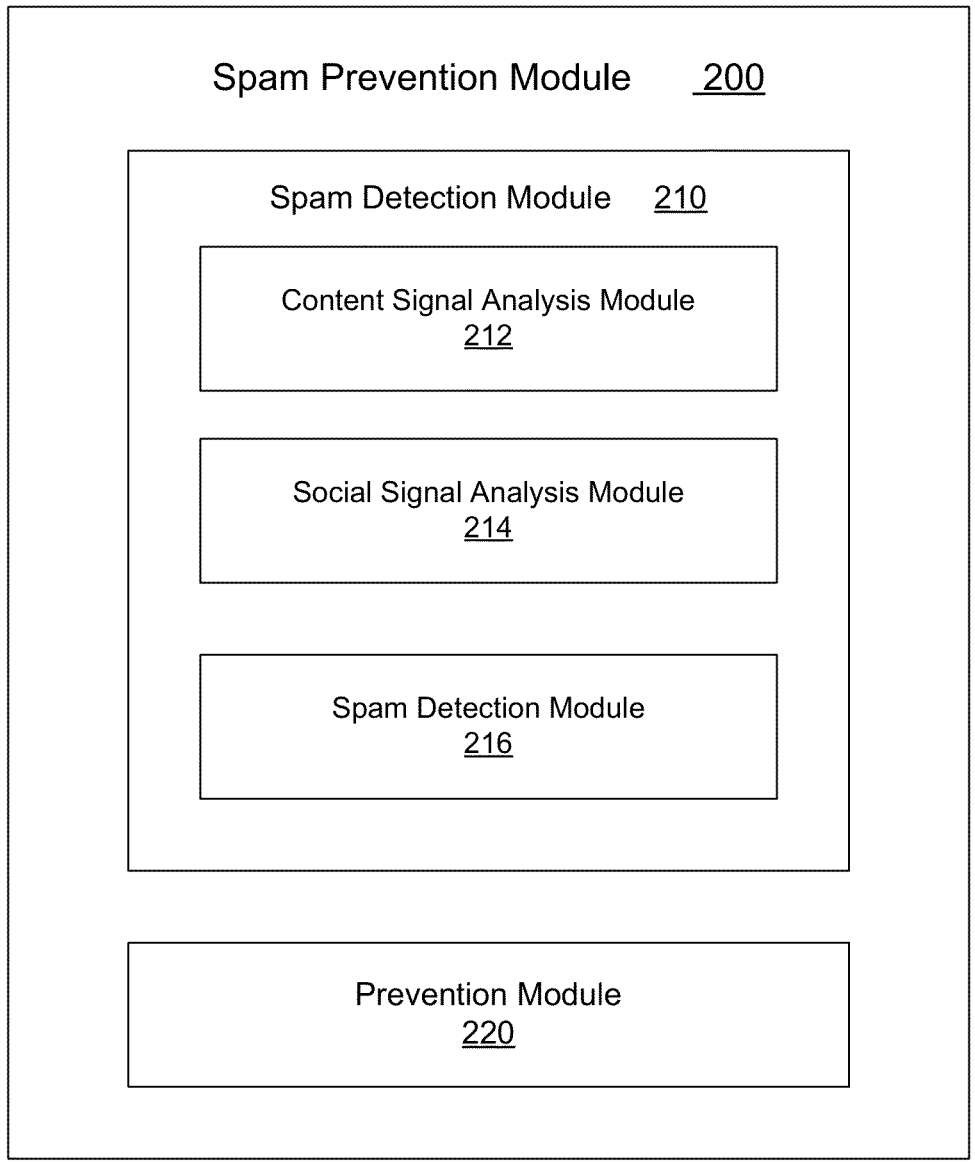
FIG. 2 is a block diagram of a spam prevention module of a social networking system according to one embodiment.

FIG. 2 is a block diagram of a spam prevention module 200 of a social networking system 130 according to one embodiment. The spam prevention module 200 includes a spam detection module 210 and a prevention module 220. The spam detection module 210 includes a content signal analysis module 212, a social signal analysis module 214, and a detection module 216. The term "spam" is used throughout to refer to any inappropriate, offensive, or otherwise undesirable content posted by a user.

The spam detection module 210 detects spam in the social networking system 130. It can detect spam in any type of content posted by a user, including posts on a user's wall or in a newsfeed, comments on posts, and other types of items on the social networking system, such as events, photos, games, advertisements, and so forth. One place where spam is particularly pernicious is in subscribed content, such as user subscription to pages of celebrities, businesses, products, etc., since this content is subscribed to and read by many users. Thus, spam in this content is transmitted widely. In particular, spam commonly appears in comments by a user on posts on the subscribed content. For example, a celebrity may have a page on which he posts, and thousands of his fans may subscribe to his page and read his posts. Users can also comment on his posts and the comments are also read by thousands of users. Thus, some users may post undesirable comments on spam in response to those posts. This example of spam in comments on posts on subscribed content is used as an example throughout this description, though it is understood that this is just an example and the invention can apply to any other content posted in which spam detection is desirable.

The spam detection module 210 detects spam in the social networking system 130 on a variety of bases. In one embodiment, the spam detection module 210 detects spam on a per comment basis by analyzing the content signals and social signals associated with the comment to determine whether the comment is spam. In another embodiment, the spam detection module 210 detects spam on a per commenting user basis by analyzing the content signals and social signals associated with comments posted by the commenting user to determine whether the commenting user is a spammer. In yet another embodiment, the spam detection module 210 detects spam associated with comments on a subject/domain (e.g., car or public figure) based on the analysis of the content signals and social signals of the comments. The spam detection analysis below is described with reference to spam detection on a per comment basis as an example. The similar analysis can be applied to spam detection on other bases.

The content signal analysis module 212 retrieves content signals related to a comment from the profile database 132 and content database 170 to analyze the content features of the comment. In one embodiment, the content signal analysis module 212 is a learned content classifier that is trained by a machine learning algorithm with the content stored in the content database 170. Any known machine learning algorithm, such as random forests, support vector machines (SVMs), logistic regression, can be used to implement the content signal analysis module 212.

In one embodiment, the content features of a comment learned by the content signal analysis module 212 include entropy of the comment, frequency of the comment and similarity of the comment with other comments. Entropy of a comment measures diversity of the text content of the comment. For example, a 100-character long comment containing only 3 unique characters has low diversity of content, which makes it more likely to be spam than a comment having the same length but higher diversity of content. The frequency of the comment measures how often the user posts comments on other users' blog or walls. For example, if the user posts the same content multiple times in a short period of time, it is likely to be spam. The similarity of the comment measures how the current comment is similar to other comments observed by the content signal analysis module 212. The similarity analysis identifies identical copies of the comment or comments with minor changes (e.g., only a few different words in a long comment), which are indicative of spam. The similarity analysis can be combined with a timing signal to measure the similarity over a predefined period of time. The content of the comment can also be considered (e.g., URLs in a comment, lots of repeated characters or symbols in a comment, or a comment in a different language than the post indicate that a comment is likely to be spam).

The content signal analysis module 212 analyzes learned content features of a comment. An example of a learned content feature is the patterns of the content of comments. For example, the comment may be a part of large number of inappropriate comments on a post from a public figure, where the comments share the common interest in the public figure. In one embodiment, the content signal analysis module 212 computes an aggregate content signal based on the various content signals. For example, the content signal analysis module 212 combines the frequency of the comment on a specific subject (e.g., public figure) with the similarity of the comment with other most recent comments by the same user to generate an aggregate content signal. The aggregate content signal indicates whether the comment contains inappropriate or spam content. The aggregate content signal can be represented by a numerical value, a binary value, and/or any other quantitative data structure.

The content signals of the learned content features can be enhanced by a social signal analysis for effective spam detection. In one embodiment, the content signal or aggregate content signal generated by the content signal analysis module 212 is augmented by the social signals associated with the comments. The social signals associated with the comments include information on how a particular comment is related with other comments within the social networking system, and also include information on social relations and social activities of the commenting users and viewing users of the comments.

The social signal analysis module 214 retrieves social signals related to a comment and may generate an aggregate social signal. For example, the social signals may include the number of viewers who are directly connected to the commenting user (e.g., if the user's connections also subscribe to the page on which the user is commenting, it is less likely that the comment is spam), the number of viewers who are indirectly connected to the commenting user, the average length of the connection between the commenting user and the user whose post is being commented by the commenting user, or the average geographical distance between the posting user and the user whose post is being commented by the commenting user. Other social signals include number of "likes" on the comment among the recipients or viewers of the comment and number of users who reported the comment as spam or annoying, the geographic locations of the viewing user and the comment user, and the number of shared connections among the viewing users. Similar social signals can be collected among a user, multiple subscribers of the user and a commenting user who comments on the wall of the user.

The social signal analysis module 214 may retrieve additional social signals related to a comment. The additional social signals include a user account with few friends, which is likely a fake user account, a user account with little profile information, photos, etc., which is likely a fake user account, a user account with friends that are not linked to each other, which is also likely a fake user account, a user whose comments/posts are rarely liked, negative comments by other users on a user's comments/posts, comments by other users to avoid clicking on a link posted by a user or avoid interacting with that user, indication by other users that a user is a spammer, indication by other users that a comment/post contains spam, friend requests sent by a user that are not accepted or are declined, friend requests sent by a user to another user that are indicated by the other user to be from an unknown person (i.e., the person receiving the friend request indicated that he does not know the sender of the request), and posts on another user's wall that were deleted by that other user.

The social signal analysis module 214 computes decisions on the social patterns/behaviors of users who posted comments on others' sites based on the social signal analysis. For example, the social signal analysis module 214 identifies certain common patterns of unacceptable behavior based on the number of "likes" (or dislikes or spam reports) from the viewing users of a comment. If a commenting user sends the same comment 80 times on a post posted by another user in the span of an hour, it is more likely to be spam. Similarly, if 75% percent the friends requests a user sends are rejected or ignored, it is very likely the sender is annoying others and/or may not actually know that his/her behavior is annoying others.

The social signal analysis module 214 generates one or more aggregate social signals using any combination of the data retrieved by the social signal analysis module 214. For example, the number of connections or edges separating the user commenting on a post and the user who posted the post in the social graph might be combined with the geographical separation between the two users to calculate an aggregate social signal that provides a composite measure of the average distance between the commenting user and the user who posted the post. The aggregate social signal indicates whether the commenting user has engaged in inappropriate or spammy behavior in posting comments on other users' sites. The aggregate social signal can be represented by a numerical value, a binary value, and/or any other quantitative data structure.

The detection module 216 receives the analysis results from the content signal analysis module 212 and the social signal analysis module 214 and determines whether the comment is spam in the case of per posting spam detection analysis. The detection module 216 similarly determines whether a commenting user is a spammer based on the analysis results from the content signal analysis module 212 and the social signal analysis module 214. For example, the detection module 216 adds the numeric values of the aggregate content signal and the aggregate social signal of a posting and compares the sum with a predetermined threshold value. Based on the comparison, the detection module 216 determines whether the comment is spam.

Figure 3:
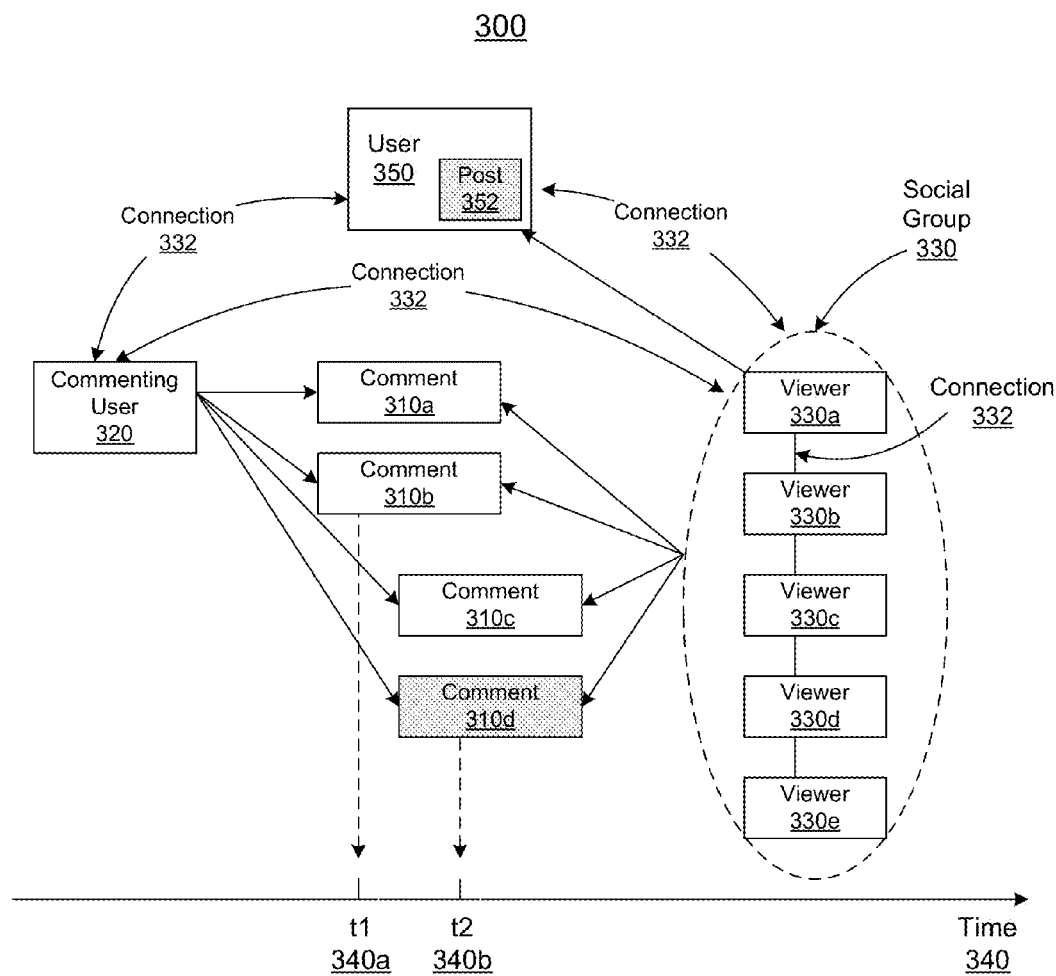
FIG. 3 is an example of interactions among a commenting user posting multiple comments on a post by another user and viewers within a social networking system according to one embodiment.

To further illustrate the spam detection described above, FIG. 3 is an example of interactions among a commenting user 320 who posts multiple comments 310a-310d on a post 352 posted by user 350 on his/her wall and viewers 330a-330e who have subscribed to the site of the user 350 within a social networking system. In the example illustrated in FIG. 4, the commenting user 320 posts two identical inappropriate comments (310a and 310b) on the wall of user 250 in response to the post 352 at time t1 (340a). A short while later, the commenting user 320 posts the same comment 310c on the wall of user 250 in response the post 352 at time t2 (340b). At the same time instance, the commenting user 320 posts a similar comment 320d on the wall of user 350. The viewers 330a-330e are connected as a social group 330 (e.g., fan base of Lady Gaga in San Francisco) and have subscribed to the site of user 350, who can review the post 352 by user 350 and comments by the commenting user 320. The commenting user 320 is also connected to the social group 330 from his home town in Japan.

The spam detection module 210 analyzes the content of the posted comments 310a-310d by considering a variety of content signals associated with the comments, e.g., the similarity between the comments, entropy of the comments, timing information of each comment and geo coherence of the comments (e.g., all four comments are from the same place), the language settings of the comments and other content signals of the comments. Other content signals may be associated with the commenting users, including the reputation or track record of the commenting user. Examples of content signals relating to reputation or track record of a user include how often a user's comments are marked as spam (i.e., a high frequency of comments marked as spam indicates a poor reputation or poor track record for that user, suggesting that the user's comment is more likely to be spam) or other indications from other users that the commenting user tends to post spam. The spam detection module 210 may apply a trained content feature extraction model learned from the content stored in the content database 170 to the analysis and generates an aggregate content signal associated with the posting user 320. For example, given the inappropriate content of the comments 310a-d, the identical or very similar content of the comments posted within a short time span, the aggregate content signal associated with the posting user 320 indicates that the comments 310a-d are inappropriate and likely spam.

The spam detection module 210 may analyze additional content signals associated with the comments. The content signals that indicate spam content include key words commonly found in spam (e.g., Viagra), lots of exclamation points or other punctuation marks (e.g., "Look here to see who's viewing your profile!!!!!"), lots of capital letters (e.g., "SEE WHO'S SEARCHING FOR YOU!"), random collections of characters or repeated characters (e.g., Viagra xlslkdigls), misspelled words or words with a character replaced (e.g., "Viaagra;" "Viagra s0ld here."), topics that are typically included in social networking spam (e.g., posts about seeing who is viewing your profile or searching for you), profanity in a post/comment, insults or common insulting terms in a post/comment, hate speech (e.g., race-based, sexual orientation based, etc.) in a post/comment, violent messages in a post/comment, and sexually explicit content.

The spam detection module 210 augments the content signal analysis with an analysis of the social signals associated with the comments 310a-310d. For example, the spam detection module 210 determines the closeness between the commenting user 320 and user 350 based on the connections between the commenting user 320 and user 350. The spam detection module 210 similarly determines the closeness between the commenting user 320 and the viewers 330a-330b based on the connections between the commenting user 320 and the viewers 330b. The spam detection module 210 counts the number of "likes" received from user 350 and/or the viewers 330 for each comment 310. Similarly, the spam detection module 210 counts the number of reports from user 350 and/or the viewers 330 marking the comment 310 as "annoying" or "spam." The spam detection module 210 may further consider other social signals, such as how many "friends" requests sent by the commenting user 320 and how many of the requests were ignored to compute the aggregate social signal. Based on the aggregate content signal and aggregate social signal, the spam detection module 210 determines that the commenting user 320 is very likely to be engaging in spam distribution and communicates the spam detection result to the prevention module 220 for remedial actions.

Returning back to FIG. 2, the prevention module 220 communicates with the spam detection module 210 to take remedial actions on detected spam. A user posting inappropriate comments on another user's wall can be a genuine spammer with an intention to harm other users, such as embedding phishing links in the comments to lure other users for his personal gain. A user posting inappropriate comments on other users' sites may use a fake account in parallel to his/her real account, e.g., to overcome rate limits associated with individual accounts, or boost the reputation or ranking of his accounts. A user could also misuse his/her account in ways that create problems for other users, e.g., sending friend requests to many strangers. Although this type of user is often not aware of his action or acts based on a misunderstanding of features provided by the social networking system 130, these unwanted friend requests are a form of spam for other users.

In one embodiment, the prevention module 210 takes a variety of pre-emptive strikes on the detected spam depending on a variety of triggering events, e.g., the type of spam distributed by a posting user. For example, if a commenting user distributes phishing links in the comments posted on other users' sites, the prevention module 220 blocks the comments or quarantines the comments. If a posting user posts comments using a fake account, the prevention module 220 blocks the comments and/or logs the fake account in a black list. If a user misuses his/her account in ways that create problems for other users, the prevention module 210 educates the user to better use the communication tools provided by the social networking system 130.

Another type of pre-emptive strike taken by the prevention module 210 is to limit the comment to the commenting user's own site or wall even if the commenting user requested posting the comment to other users' sites. The prevention module 220 creates a "ghost" setting around the comment that is potentially harmful, offensive or inappropriate to other users. By limiting the commenting area of a potentially harmful comment, the prevention module 220 is able to do further investigating, provide the commenting user a chance to appeal the decision made by the spam detection module 210 and enhance the accuracy of spam detection. In some cases, the user may not even be aware that his comment was not shared more generally with other users.

Figure 4:
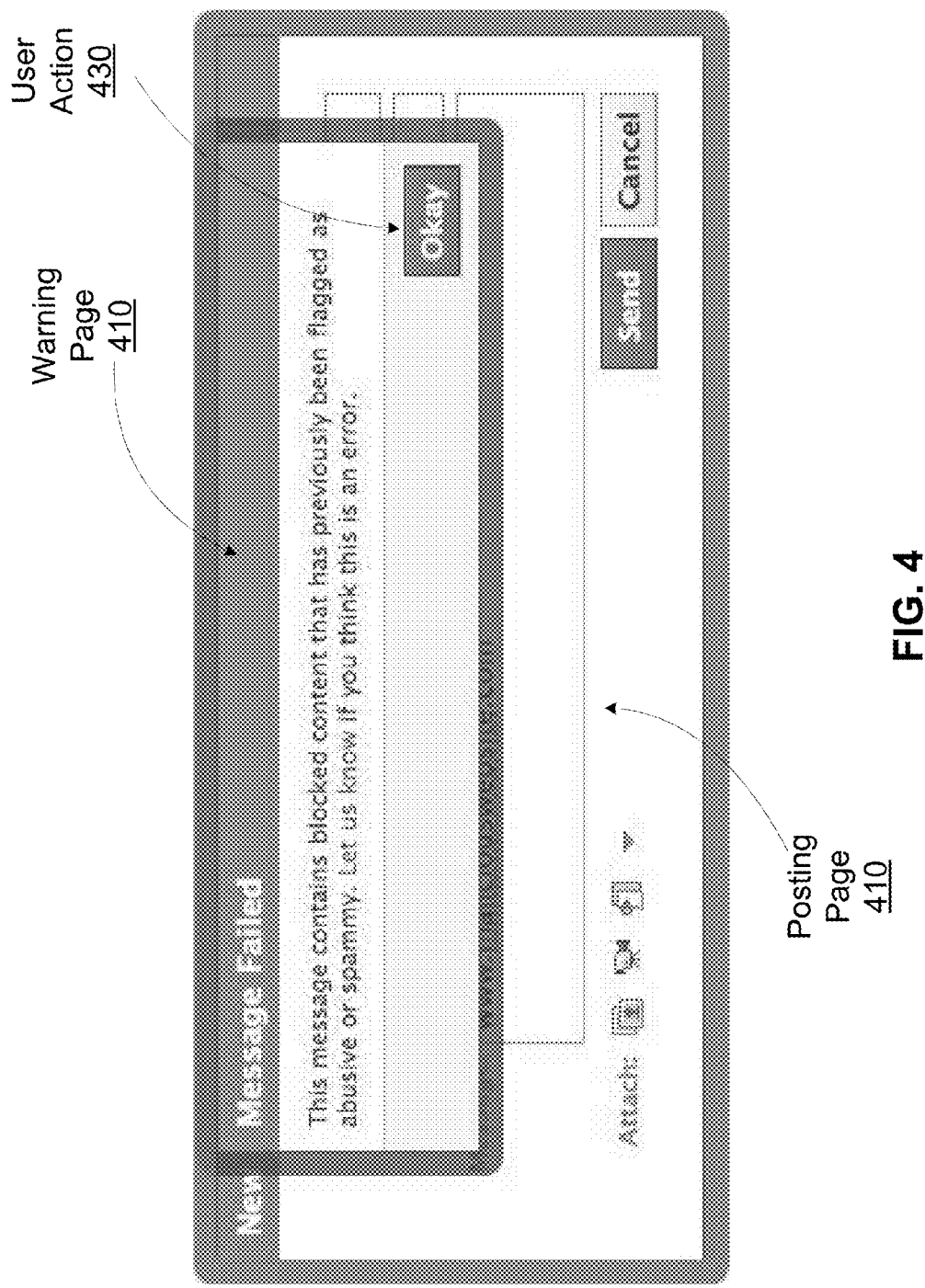
FIG. 4 is an example graphical user interface displaying warning messages regarding a detected spam comment in a social networking system.

To reduce false positive spam detection and better educate users who posted inappropriate comments on another user's wall, the prevention module 220 communicates with the commenting users about the comments in a user friendly way. FIG. 4 is an example graphical user interface displaying warning messages of a detected spam message in a social networking system 130. A user drafts a comment on a page 410 and sends the comment to one or more other users. Upon detecting the request to post the comment to other users' sites, the spam prevention module 200 determines whether the comment contains content that is offensive or suspicious. Upon the determination that the comment is indeed offensive or spam, the spam prevention module 200 displays a warning message 420 to the user. The user can take action, such as confirming 430 it was an error with the social networking system 430. In other embodiments, the module 200 provides a message to the user before the comment is posted asking whether the user wants to post the comment and possibly reminding the user to avoid offensive comments.

Figure 5:
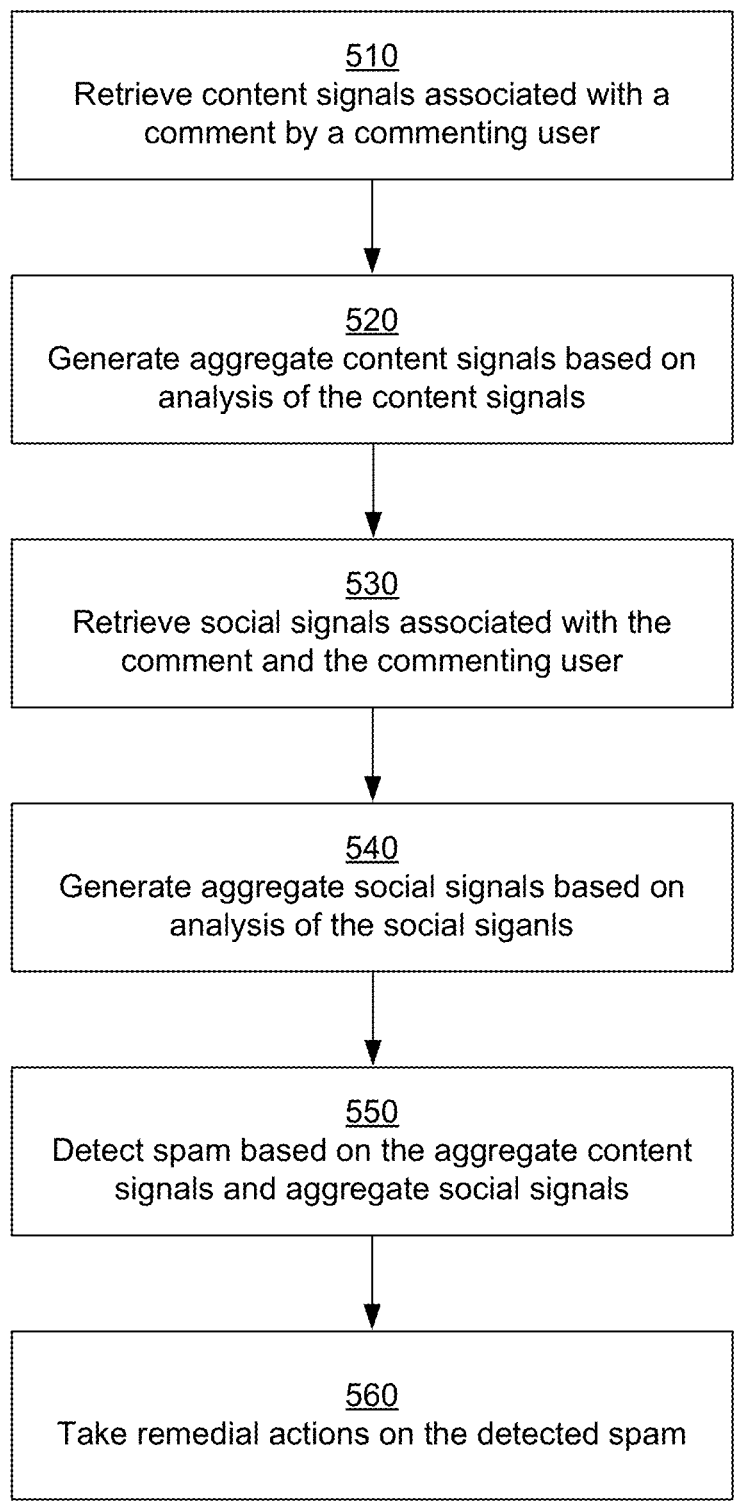
FIG. 5 is a flowchart illustrating detecting and preventing spam in a social networking system according to one embodiment.

FIG. 5 is a flowchart of detecting and preventing spam in a social networking system according to one embodiment. The spam prevention module 200 retrieves 510 content signals of a comment posted by a commenting user in response to a posting posted by another user. The content signals of a comment include entropy of the comment, frequency of the comment and similarity of the comment with other comments. The spam prevention module 200 analyzes the content signals and generates 520 one or more aggregate content signals, which indicate whether the comment contains inappropriate or spam content.

To enhance the spam detection based on the content signal analysis of a comment, the spam prevention module 200 augments the content signal analysis with analysis of social signals of the comment and/or the commenting user of the comment. The spam prevention module 200 retrieves 530 social signals associated with the comment and the commenting user. The social signals include the number of direct and indirect connections between the commenting user and another user who posted the post, the average length of the connection between the commenting user and the another user, the average geographical distance between the commenting user and the another user, the number of "likes" on the comments among the recipients of the comments and number of users who reported the comment as spam or annoying, and the number of shared connections among the commenting user, the user who posted the post and viewing users connected to the commenting user and the user who posted the post. The spam prevention module 200 analyzes the social signals and generates 540 one or more aggregate social signals of the comment.

Based on the analysis of content signals and social signals of the comment and the commenting user, the spam prevention module 200 detects 550 whether there is spam in the comment posted by the commenting user. The spam prevention module 220 further takes remedial actions on the detected spam, including blocking the comment, quarantining the comment, adding the commenting user account to a black list, educating the commenting user about his/her inappropriate behavior and other remedial actions.

With spam detection using not only content signals but also social signals of comments posted on users' sites, the social networking system 130 is able to detect inappropriate and spam content of the comments and take remedial actions on detected spam. Furthermore, the social networking system 130 is able to build trust among the users and effectively bring users together in the online social networking environment created by the social networking system 130.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method, comprising:
    receiving a comment by a user to a post posted by another user of a social networking environment;
    analyzing one or more content signals of the comment, the content signals indicating whether the comment contains spam;
    analyzing one or more social signals of the comment, wherein the social signals of the comment comprise information on social relations and social activities of the user in the social networking environment, and the social signals of the comment indicate whether the comment contains spam, wherein analyzing one or more social signals of the comment comprises:
        identifying one or more common patterns of unacceptable behavior of the user who posted the comment and
        generating one or more aggregate social signals associated with the comment based on the identified one or more common patterns of unacceptable behavior of the user;
    determining whether the comment contains spam based on the analysis of the content signals and the analysis of the social signals associated with the comment; and
    responsive to the determination that the comment is spam, taking remedial action regarding the comment.

2. The computer implemented method of claim 1, wherein the content signals comprise at least one of entropy of the comment, frequency of posting of the comment by the user and similarity of the comment with other comments posted by the user.

3. The computer implemented method of claim 1, wherein the social signals associated with the comment include at least one of:
    a number of viewers that are directly connected to the user who posted the post;
    a number of viewers that are indirectly connected to the user who posted the post;
    an average length of connection between the user who posted the comment and the user who posted the post;
    an average geographical distance between the user who posted the comment and the user who posted the post;
    a number of "likes" on the comment among viewers of the comment;
    a number of viewers who reported the comment as spam or annoying; and
    a number of shared connections among the user who posted the post, the user who posted the comment on the post and viewers of the comment.

4. The computer implemented method of claim 1, wherein analyzing the content signals comprises:
    applying a trained content feature extraction model to the content signals of the comment, the content feature extraction model being trained on a plurality of content signals of a corpus of comments received by the social networking system; and
    determining whether the comment contains one or more common patterns of inappropriate or spam content based on content features of the comment.

5. The computer implemented method of claim 4, further comprising:
   generating one or more aggregate content signals based on the analysis of the content signals, an aggregate content signal indicating whether the comment contains at least some inappropriate or spam content.

6. The computer implemented method of claim 1, wherein the one or more common patterns of unacceptable behavior of the user who posted the comment are based on the number of "likes" from viewers of the comment.

7. The computer implemented method of claim 1, wherein the remedial action comprises at least one of:
   blocking the comment that is spam;
   adding a user account of the user who posted the comment that is spam to a black list;
   quarantining the comment that is spam; and
   communicating with the user who posted the comment or is about to post the comment to avoid posting spam content.

8. The computer implemented method of claim 1, wherein taking the remedial action comprises:
   blocking the comment responsive to the comment having a link to a website known to compromise a visitor's confidential information.

9. The computer implemented method of claim 1, wherein taking the remedial action further comprises:
   responsive to the user who posted the comment using a fake user account, adding the fake user account to a black list, which contains a list of users whose comments are blocked.

10. The computer implemented method of claim 1, wherein taking the remedial action further comprises:
    responsive to the user having posted identical or similar comments, presenting the user with a communication interface for the user to take a user action related to the comment.

11. A non-transitory computer-readable storage medium storing computer program instructions, executed by a computer processor, for detecting spam in a social networking system, the computer program instructions comprising instructions for:
    receiving a comment by a user to a post posted by another user of a social networking environment;
    analyzing one or more content signals of the comment, the content signals indicating whether the comment contains spam;
    analyzing one or more social signals of the comment, wherein the social signals of the comment comprise information on social relations and social activities of the user, and the social signals of the comment indicate whether the comment contains spam, wherein analyzing one or more social signals of the comment comprises:
        identifying one or more common patterns of unacceptable behavior of the user who posted the comment and
        generating one or more aggregate social signals associated with the comment based on the identified one or more common patterns of unacceptable behavior of the user;
    determining whether the comment contains spam based on the analysis of the content signals and the analysis of the social signals associated with the comment; and
    responsive to the determination that the comment is spam, taking remedial action regarding the comment.

12. The computer-readable storage medium of claim 11, wherein the content signals comprise at least one of entropy of the comment, frequency of posting of the comment by the user and similarity of the comment with other comments posted by the user.

13. The computer-readable storage medium of claim 11, wherein the social signals associated with the comment include at least one of:
    a number of viewers that are directly connected to the user who posted the post;
    a number of viewers that are indirectly connected to the user who posted the post;
    an average length of connection between the user who posted the comment and the user who posted the post;
    an average geographical distance between the user who posted the comment and the user who posted the post;
    a number of "likes" on the comment among viewers of the comment;
    a number of viewers who reported the comment as spam or annoying; and
    a number of shared connections among the user who posted the post, the user who posted the comment on the post and viewers of the comment.

14. The computer-readable storage medium of claim 11, wherein the computer program instructions for analyzing the content signals comprise computer program instructions for:
    applying a trained content feature extraction model to the content signals of the comment, the content feature extraction model being trained on a plurality of content signals of a corpus of comments received by the social networking system; and
    determining whether the comment contains one or more common patterns of inappropriate or spam content based on content features of the comment.

15. The computer-readable storage medium of claim 14, further comprising computer program instructions for:
    generating one or more aggregate content signals based on the analysis of the content signals, an aggregate content signal indicating whether the comment contains at least some inappropriate or spam content.

16. The computer-readable storage medium of claim 11, wherein the one or more common patterns of unacceptable behavior of the user who posted the comment are based on the number of "likes" from viewers of the comment.

17. The computer-readable storage medium of claim 11, wherein the remedial action comprises at least one of:
    blocking the comment that is spam;
    adding a user account of the user who posted the comment that is spam to a black list;
    quarantining the comment that is spam; and
    communicating with the user who posted the comment or is about to post the comment to avoid posting spam content.

18. The computer-readable storage medium of claim 11, wherein the computer program instructions for taking the remedial action comprise computer program instruction for:
    blocking the comment responsive to the comment having a link to a website known to compromise a visitor's confidential information.

19. The computer-readable storage medium of claim 11, wherein the computer program instructions for taking the remedial action further comprise computer program instructions for:
    responsive to the user who posted the comment using a fake user account, adding the fake user account to a black list, which contains a list of users whose comments are blocked.

20. The computer-readable storage medium of claim 11, wherein the computer program instructions for taking the remedial action further comprise computer program instructions for:

responsive to the user having posted identical or similar comments, presenting the user with a communication interface for the user to take a user action related to the comment.

\* \* \* \* \*

UNITED STATES PATENT AND TRADEMARK OFFICE
CERTIFICATE OF CORRECTION

PATENT NO. : 9,537,814 B2
APPLICATION NO. : 13/714776
DATED : January 3, 2017
INVENTOR(S) : Yigal Dan Rubinstein et al.

Page 1 of 1

It is certified that error appears in the above-identified patent and that said Letters Patent is hereby corrected as shown below:

On the Title Page

Item (72), Line 2, delete "Josh Wiseman", insert --Joshua Wiseman--

Signed and Sealed this
Third Day of April, 2018

Andrei Iancu
*Director of the United States Patent and Trademark Office*